(12) United States Patent
Poulin et al.

(10) Patent No.: US 7,898,136 B2
(45) Date of Patent: Mar. 1, 2011

(54) PERMANENT MAGNET ROTOR ASSEMBLY

(75) Inventors: Stéphane Poulin, Sainte-Julie (CA);
Gérald Martin, Verdun (CA); Sébastien Bigras, Longueuil (CA); Mathieu Guertin, McMasterville (CA); Steve Fleming, Boucherville (CA)

(73) Assignee: TM4 Inc., Boucherville, Quebec (CA)

( * ) Notice: Subject to any disclaimer, the term of this patent is extended or adjusted under 35 U.S.C. 154(b) by 254 days.

(21) Appl. No.: 11/954,317

(22) Filed: Dec. 12, 2007

(65) Prior Publication Data

US 2008/0197737 A1    Aug. 21, 2008

(51) Int. Cl.
*H02K 1/28* (2006.01)

(52) U.S. Cl. ........... 310/156.26; 310/156.08; 310/156.19

(58) Field of Classification Search ............. 310/156.12, 310/156.13, 156.19, 156.23, 156.26, 156.08
See application file for complete search history.

(56) References Cited

U.S. PATENT DOCUMENTS

| | | | | |
|---|---|---|---|---|
| 2,963,599 | A * | 12/1960 | Gayler | 310/153 |
| 3,368,275 | A * | 2/1968 | Eberline et al. | 29/598 |
| 3,828,212 | A * | 8/1974 | Harkness et al. | 310/153 |
| 4,219,752 | A * | 8/1980 | Katou | 310/156.19 |
| 5,998,902 | A * | 12/1999 | Sleder et al. | 310/153 |
| 6,339,271 | B1 * | 1/2002 | Noble et al. | 310/74 |
| 6,384,504 | B1 | 5/2002 | Ehrhart et al. | |
| 7,057,320 | B2 * | 6/2006 | Abordi et al. | 310/103 |
| 2004/0140725 | A1 | 7/2004 | Takahashi | |

* cited by examiner

*Primary Examiner* — Burton Mullins
(74) *Attorney, Agent, or Firm* — Fay Kaplun & Marcin, LLP

(57) ABSTRACT

An illustrative embodiment of the present invention is concerned with a permanent magnet rotor for an electric machine provided with an internal stator and a coaxial external rotor. To overcome the drawbacks associated with the use of an adhesive to mount the permanent magnets to the rotor body, permanent magnet spacing and retaining elements are mounted to the inner surface of the rotor, between adjacent magnets.

16 Claims, 16 Drawing Sheets

FIG_5

FIG_7

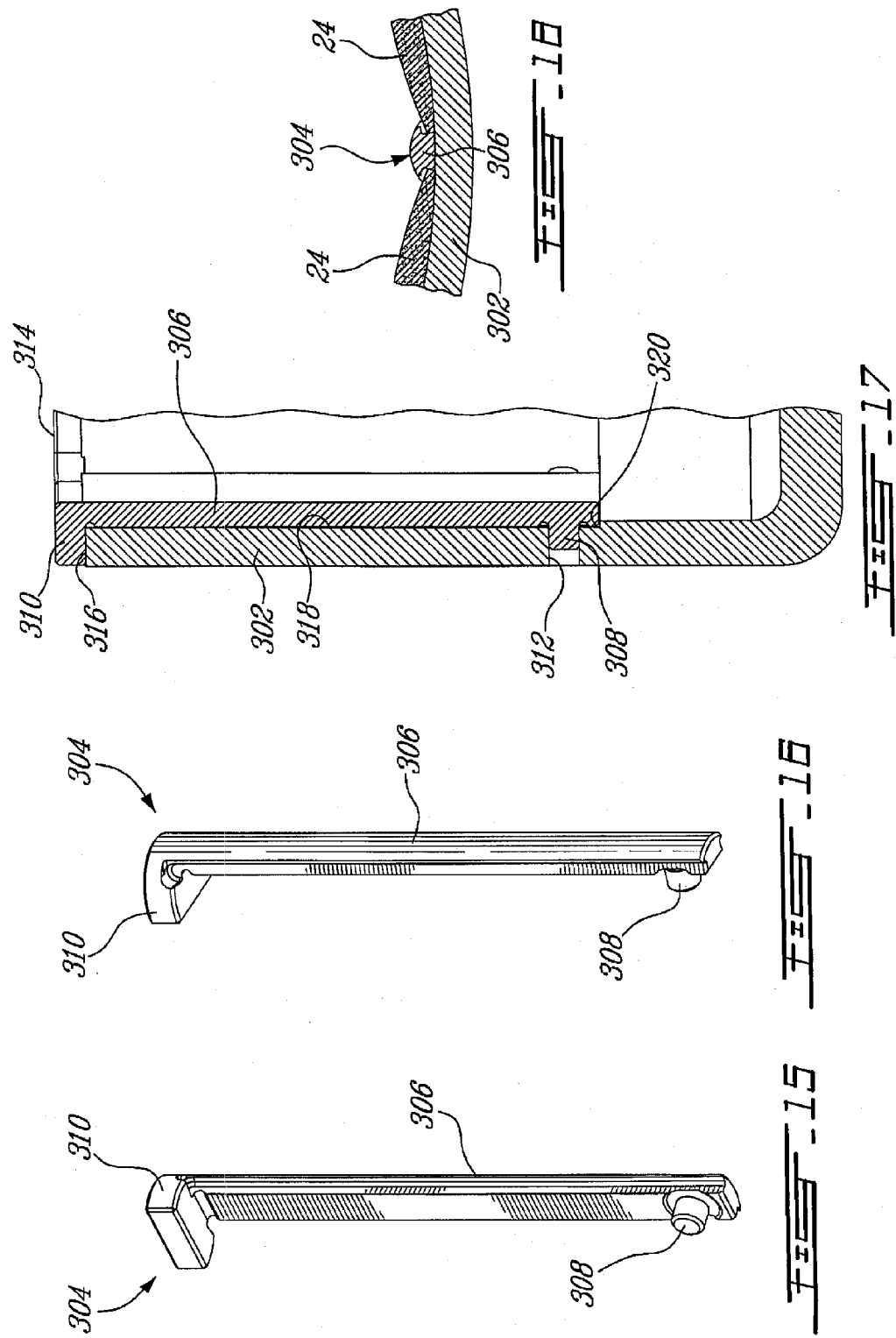

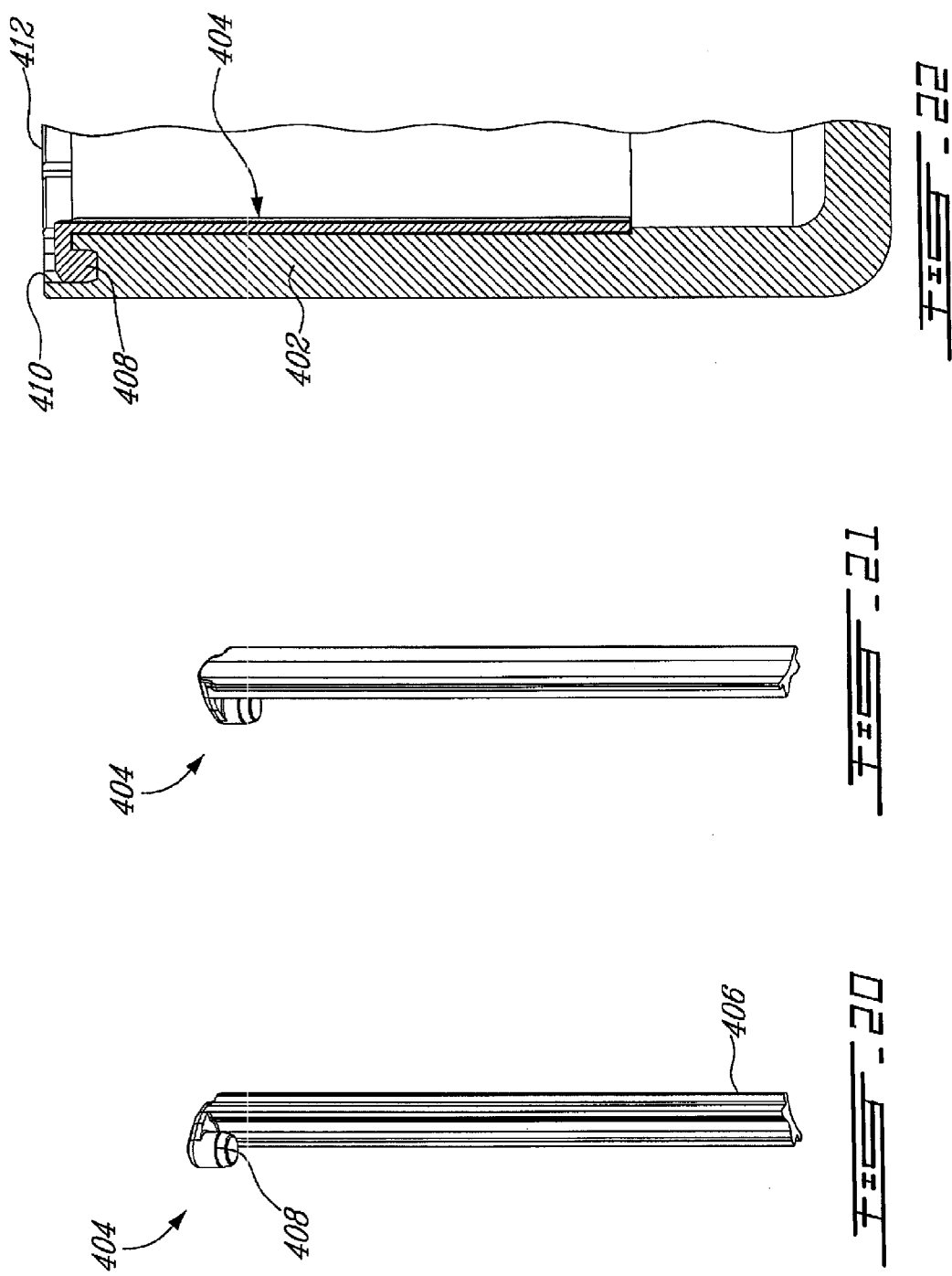

PERMANENT MAGNET ROTOR ASSEMBLY

FIELD

The present invention relates to permanent magnet electric machines. More specifically, the present invention is concerned with a permanent magnet rotor assembly including magnet retaining elements.

BACKGROUND

Permanent magnet electric machines are well known in the art. They are usually provided with a stator and a rotor coaxially mounted to the stator so as to rotate thereabout.

Some permanent magnet electric machines are provided with an internal stator and an external rotor generally enclosing the stator. When this is the case, the rotor has a generally cylindrical body and the permanent magnets are positioned on the inner surface of the cylindrical body. To properly mount the permanent magnet to the inner surface of the cylindrical body it is conventional to use an adhesive to prevent relative movements of adjacent permanent magnets.

The use of an adhesive between the permanent magnets and the inner surface of the cylindrical body has many drawbacks. First, an adequate adhesive must be selected since the operating temperature of an electric machine may be quite high. Second, the cost associated with the use of an adhesive is quite high when the price of the adhesive, the manual labour costs, the tooling costs and the parts cleaning costs are added. Indeed, for the adhesive to work properly, the mating surfaces of the permanent magnets and the cylindrical body must be properly prepared and cleaned before the adhesive is applied, which is both time consuming and increases the manufacturing cost of the rotor.

An object of the present invention is therefore to provide an improved permanent magnet rotor assembly.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 15 is a perspective view illustrating the wall contacting surface of one of the individual spacers used in the rotor of FIG. 14;

FIG. 16 is a perspective view illustrating the apparent surface of the individual spacer of FIG. 15;

FIG. 17 is a sectional view taken along line 17-17 of FIG. 14;

FIG. 18 is a sectional view taken along line 18-18 of FIG. 14;

FIG. 20 is a perspective view illustrating the wall contacting surface of one of the individual spacers used in the rotor of FIG. 19;

FIG. 21 is a perspective view illustrating the apparent surface of the individual spacer of FIG. 20; and FIG. 22 is a sectional view taken along line 22-22 of FIG. 14.

DETAILED DESCRIPTION

In accordance with an illustrative embodiment of the present invention, there is provided a rotor assembly for an external rotor electric machine, the rotor assembly comprising:

a generally cylindrical rotor body provided with an inner surface; the rotor body defining a longitudinal rotation axis;

at least two permanent magnets longitudinally mounted to the inner surface of the rotor body, at least two spacing elements longitudinally mounted to the inner surface of the rotor body between adjacent permanent magnets; the at least two spacing elements being so configured and sized as to prevent relative movement of the permanent magnets with respect to the rotor body.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claims, the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

Generally stated, illustrative embodiments of the present invention are concerned with a permanent magnet rotor for an electric machine provided with an internal stator and a coaxial external rotor. To overcome the drawbacks associated with the use of an adhesive mentioned hereinabove, a permanent magnet retaining cage is used. This permanent magnet retaining cage is mounted to the cylindrical rotor body to properly position and maintain the permanent magnets to the inner surface of the rotor body. Other illustrative embodiments of the present invention describe individual spacers to be mounted between adjacent permanent magnets.

Figure 1:
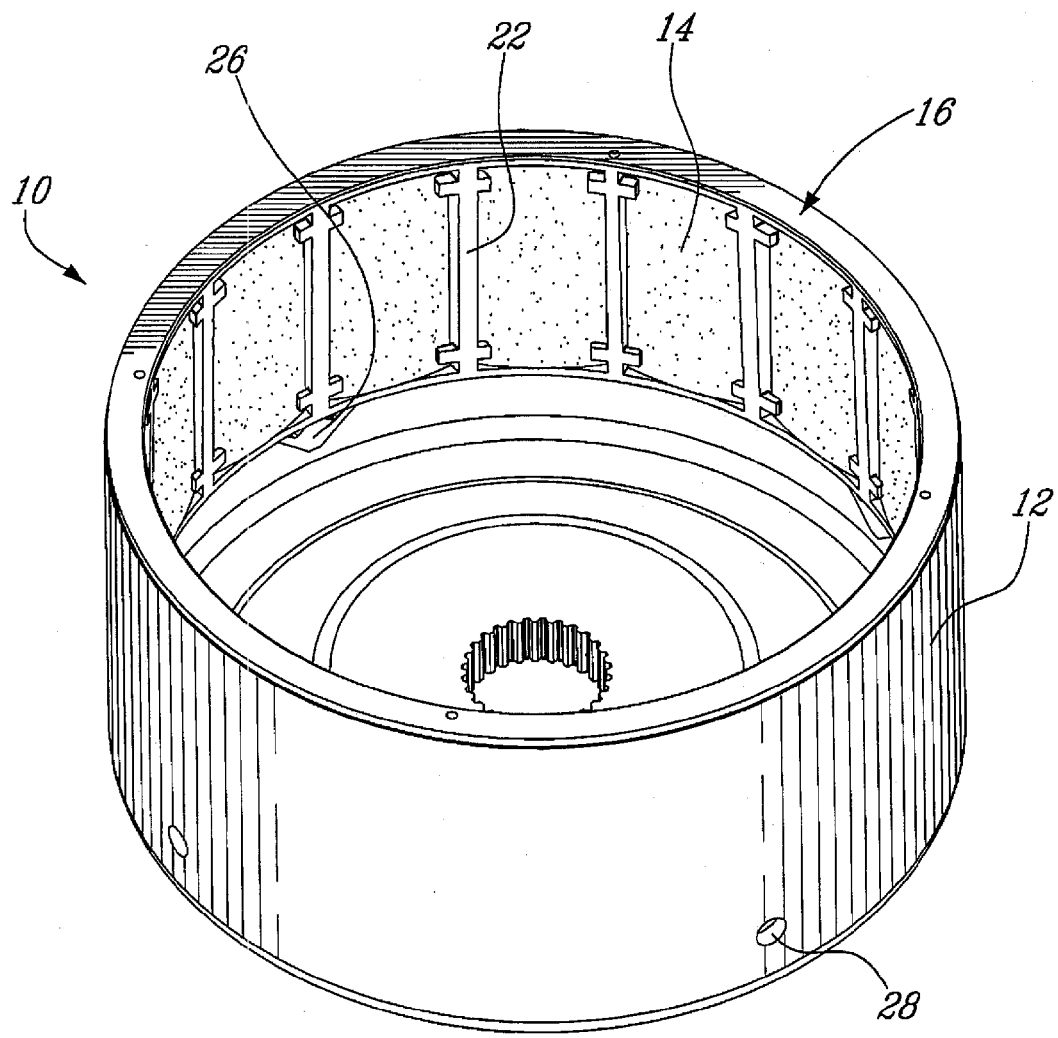
FIG. 1 is a perspective view of a permanent magnet rotor assembly according to a first illustrative embodiment of the present invention.

Turning now more specifically to FIG. 1 of the appended drawings, a permanent magnet rotor 10 will be described. The rotor 10 includes a generally cylindrical body 12, a plurality of permanent magnets 14 magnetically mounted to the inner surface of the body 12 and a permanent magnet retaining cage 16 maintaining the position of the permanent magnets 14 to the body 12.

Figure 2:
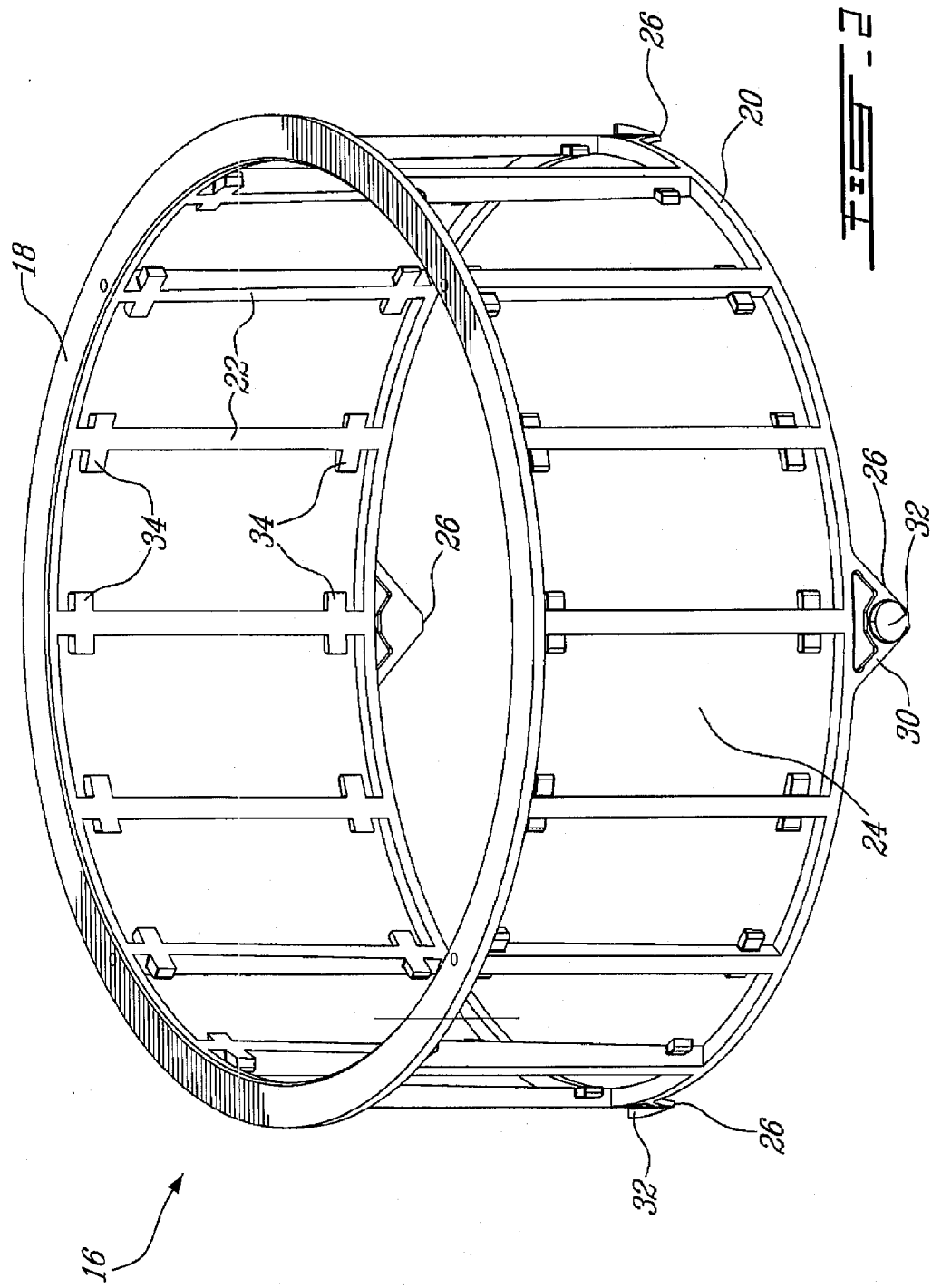
FIG. 2 is a perspective view of a magnet retaining cage used in the permanent magnet rotor assembly of FIG. 1.

As can be better seen from FIG. 2, the permanent magnet retaining cage 16 includes a top ring 18, a bottom ring 20 and a plurality of spacing elements 22 provided between the top and bottom rings 18 and 20. The spacing elements 22 and rings 18 and 20 defining permanent magnet cavities 24.

In the appended figures, the rotor 10 is provided with sixteen (16) permanent magnets 14. Accordingly, the permanent magnet retaining cage 16 includes sixteen (16) spacing elements 22 defining sixteen (16) permanent magnet cavities 24. Of course, a different number of permanent magnets could be used, depending on the electric machine being made.

Figure 5:
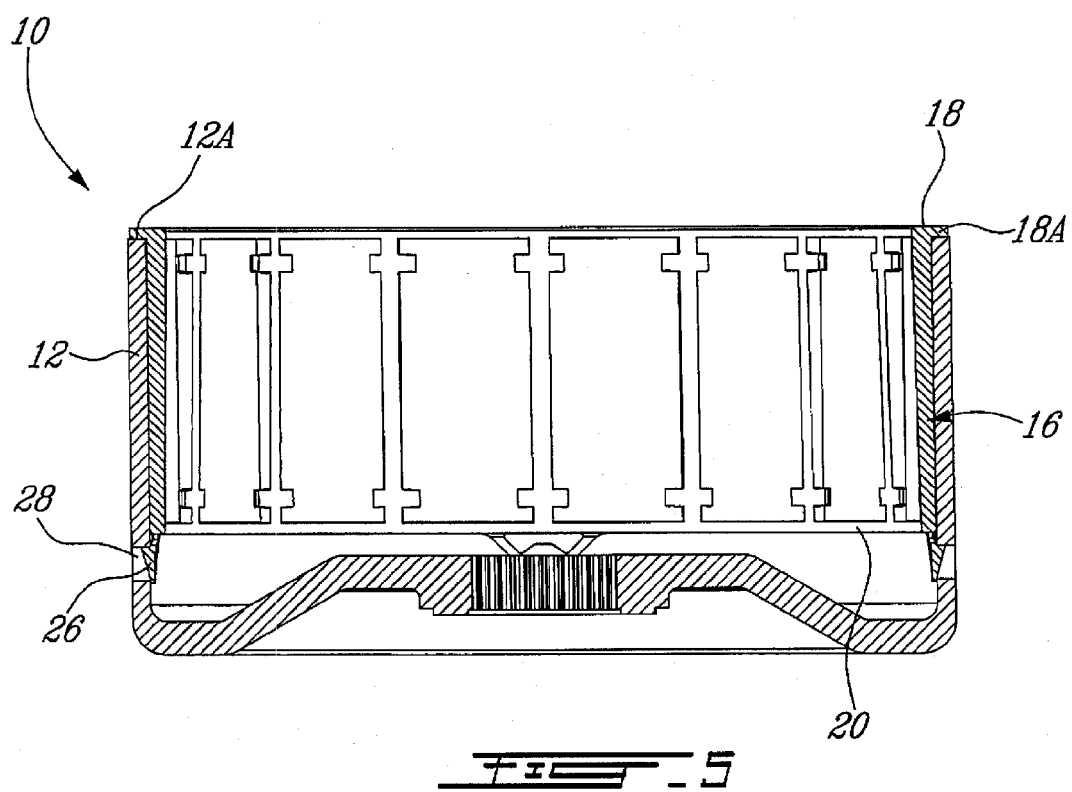
FIG. 5 is a sectional side elevation view of the permanent magnet rotor assembly of FIG. 1.

As can be better seen from FIG. 5, the top ring 18 of the permanent magnet retaining cage 16 includes a flange 18A that is so configured and sized as to engage the free end 12A of the rotor body 12 when inserted therein.

Returning to FIG. 2, the bottom ring 20 of the permanent magnet retaining cage 16 includes four (4) clips 26 so configured as to be deflected during insertion of the cage 16 in the rotor body and to enter a respective circular aperture 28 of the rotor body 12 (see FIG. 1). More specifically, each clip 26 includes a generally V-shaped support 30 and a circular sloped clipping element 32 that is insertable in the circular aperture 28. The support 30 is flexible enough so that the clip 26 is deflected inwardly when the sloped surface of the clipping element 32 contacts the inner surface of the body 12 during insertion.

As will be understood by one skilled in the art, the interconnection of the clips 26 and of the apertures 28 of the body 12 prevent the permanent magnet retaining cage 16 and magnets to rotate with respect to the body 12 and to move axially therein.

The spacing elements 22 are integrally formed with the top and bottom rings 18 and 20. The width of the spacing elements 22 determines the distance separating adjacent magnets 14. As can be better seen from FIG. 2, the spacing elements 22 are provided with four (4) projections 34 configured and sized as to contact a surface of the magnet 14.

Figure 3:
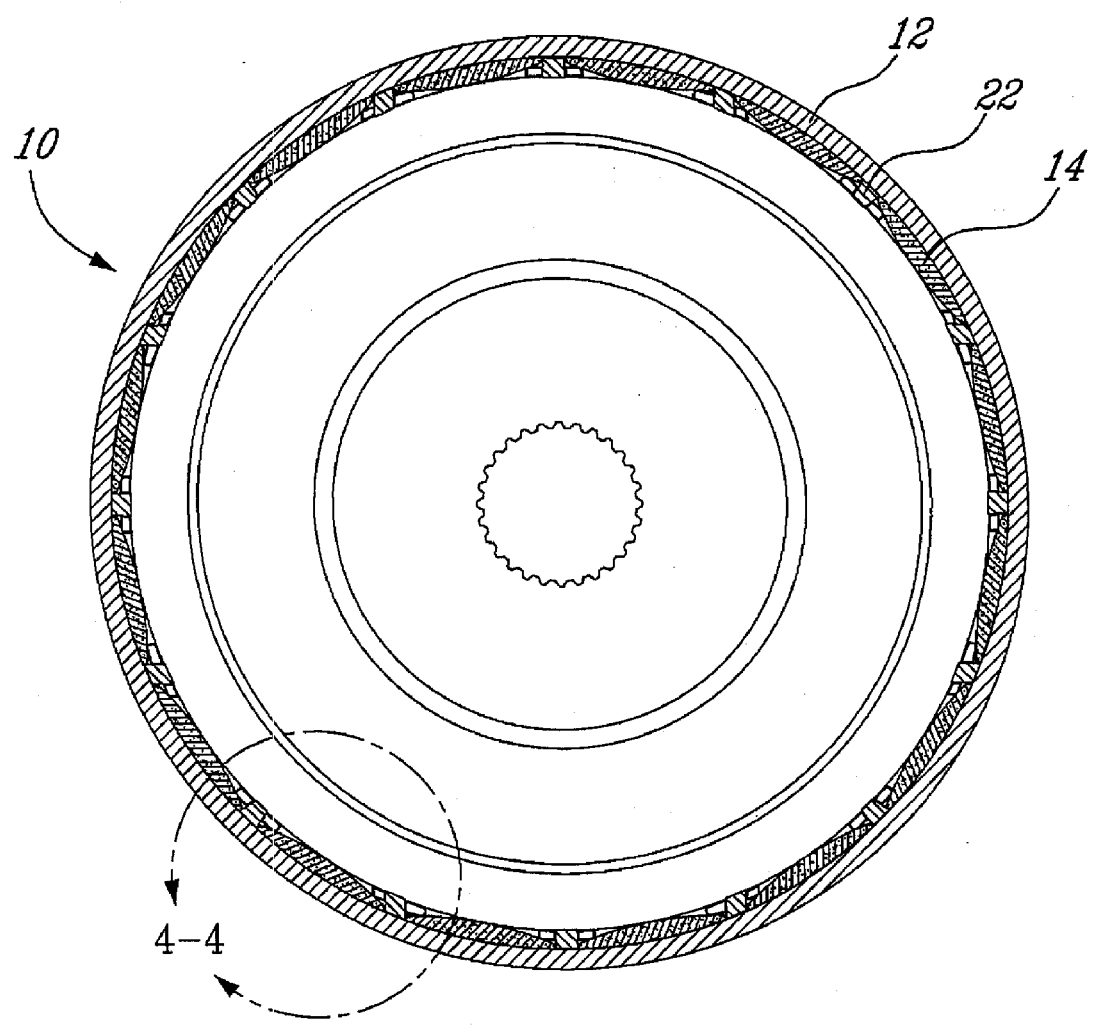
FIG. 3 is a top plan view of the permanent magnet rotor assembly of FIG. 1.

FIG. 3 is a sectional top plan view of the rotor 10 provided with magnets 14 and the permanent magnet retaining cage 16. This figure illustrates the relationship between these elements. It is to be noted that this figures also shows that the thickness of the spacing elements 22 and of the magnets 14 is similar, therefore allowing the air gap provided between the rotor 10 and the stator (not shown) to be the same as if conventional adhesive was used.

Figure 4:
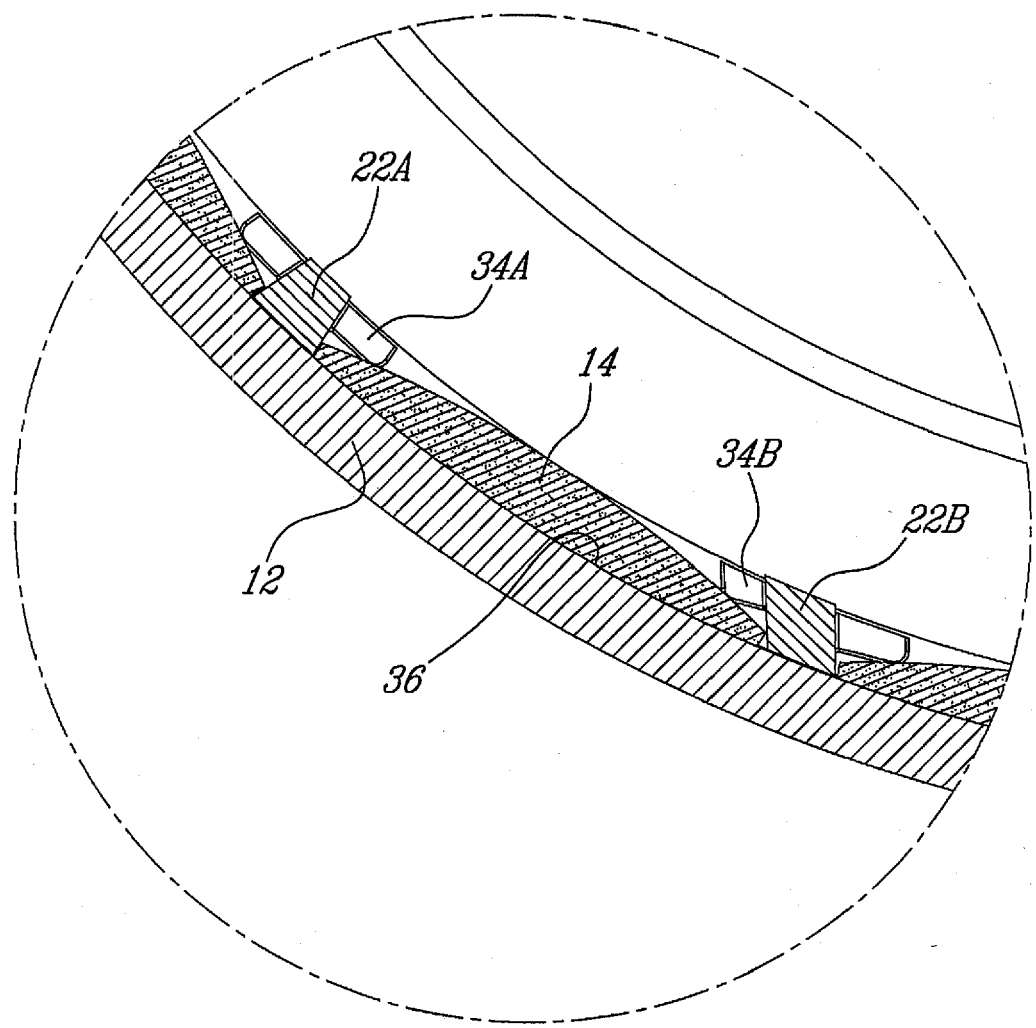
FIG. 4 is a close up view taken along line 4-4 of FIG. 3.

A close-up of a portion of FIG. 3 is illustrated in FIG. 4. This figure illustrates a magnet 14 mounted to the inner surface 36 of the body 12 and enclosed between spacing elements 22A and 22B. The spacing element 22A includes two projections 34A (only one shown) applying a pressure on the magnet 14 in the direction of the body 12. Similarly, the spacing element 22B includes two projections 34B (only one shown) applying a pressure on the magnet 14 in the direction of the body 12.

FIG. 4 also shows that the body contacting surface of the magnets 14 has the same curvature as the internal surface 36 of the body 12, thereby maximizing the contact surface therebetween.

The magnets are therefore spaced as desired and no circumferential movement of the magnets 14 with respect to the body 12 can occur while the permanent magnet retaining cage 16 is intact.

As is apparent in FIGS. 3 and 4, the spacing elements 22 of this illustrated embodiment of the permanent magnet retaining cage illustrated herein are not identical. Indeed, since the permanent magnet retaining cage 16 is intended to be injection molded, it is interesting to use a shape that may easily be removed from the mold without having to design an overly complex mold. Accordingly, the permanent magnet retaining cage 16 has been designed to be molded in a mold cavity (not shown) having four (4) mold portions that are radially movable.

For the same reasons, the projections 34 are not identical for each spacing element 22.

Of course, the number of mold portions could vary and the spacing elements 22 and the projections 34 could be shaped differently according, for example, to the number of mold portions.

It is however to be noted that the portion of the spacing elements 22 that is in contact with the inner surface 36 of the body 12 has the same width for each spacing element so that the distance separating the magnets 14 is constant. The permanent magnet retaining cage 16 therefore allow the distribution of the magnets 14 as determined by the designer and prevent undesired movements of the magnets with respect to the rotor 10.

Figure 6:
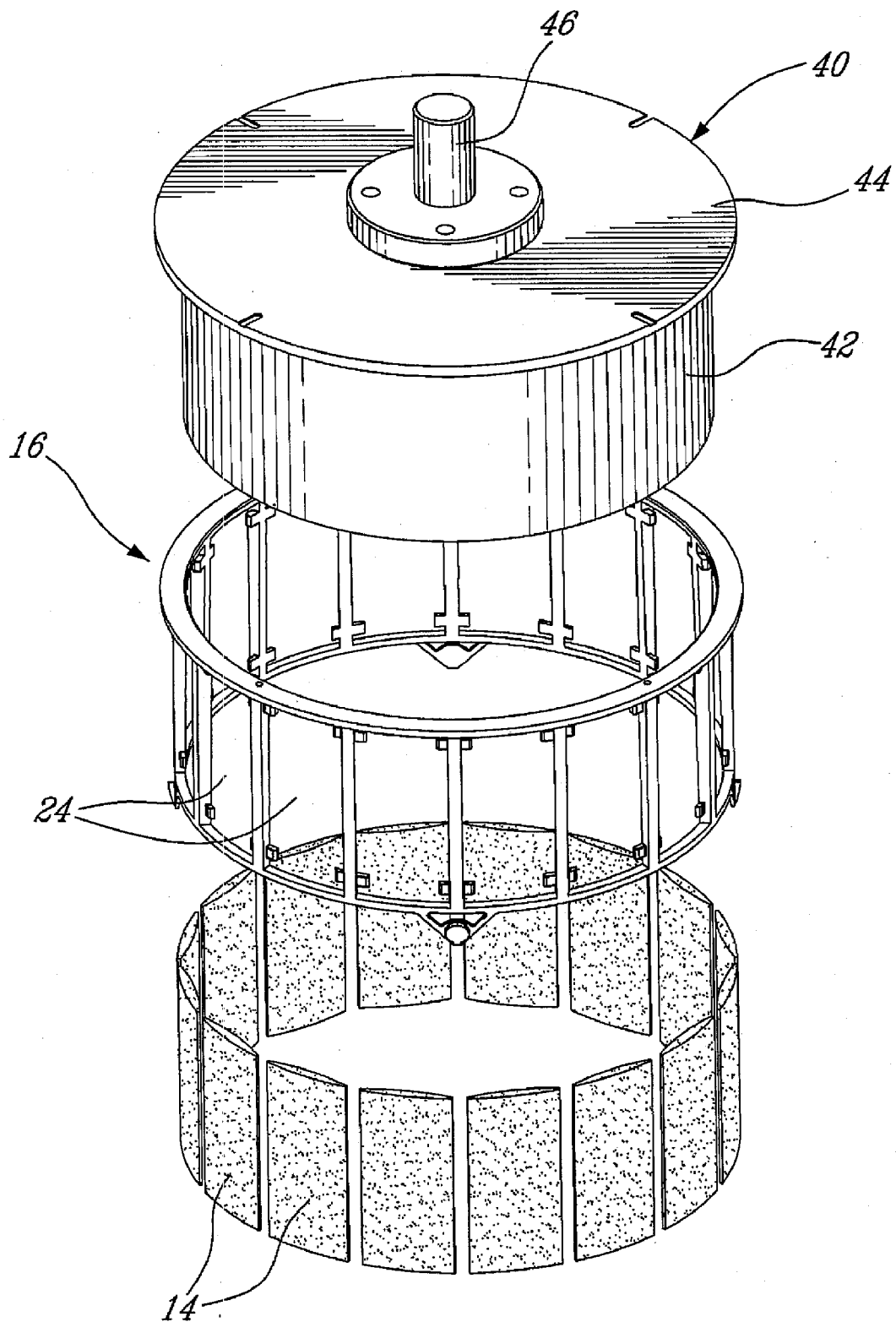
FIG. 6 is an exploded perspective view of a permanent magnet mounting assembly used to temporarily support the magnet retaining cage and the permanent magnets.
Figure 7:
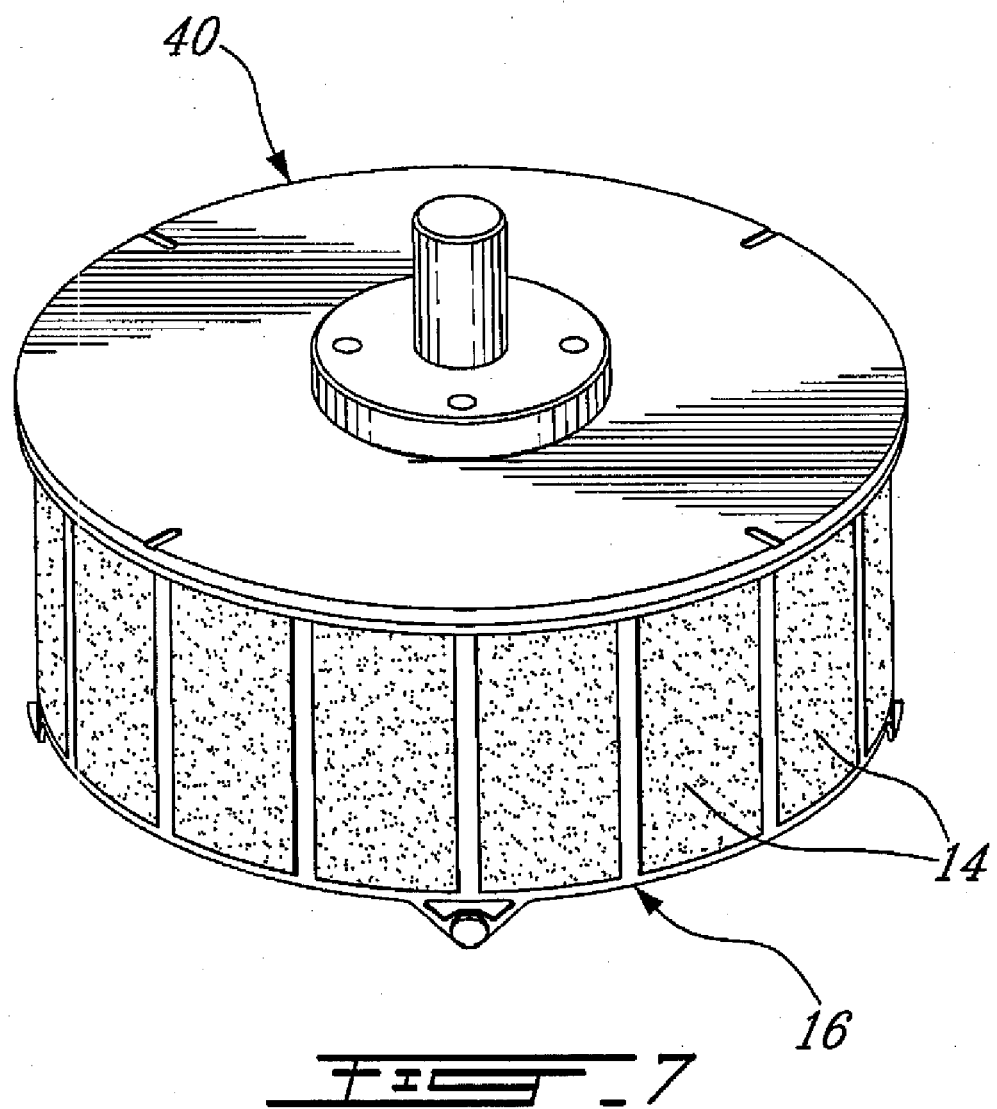
FIG. 7 is a perspective view of the permanent magnet mounting assembly to which the magnet retaining cage and the permanent magnets are mounted.
Figure 8:
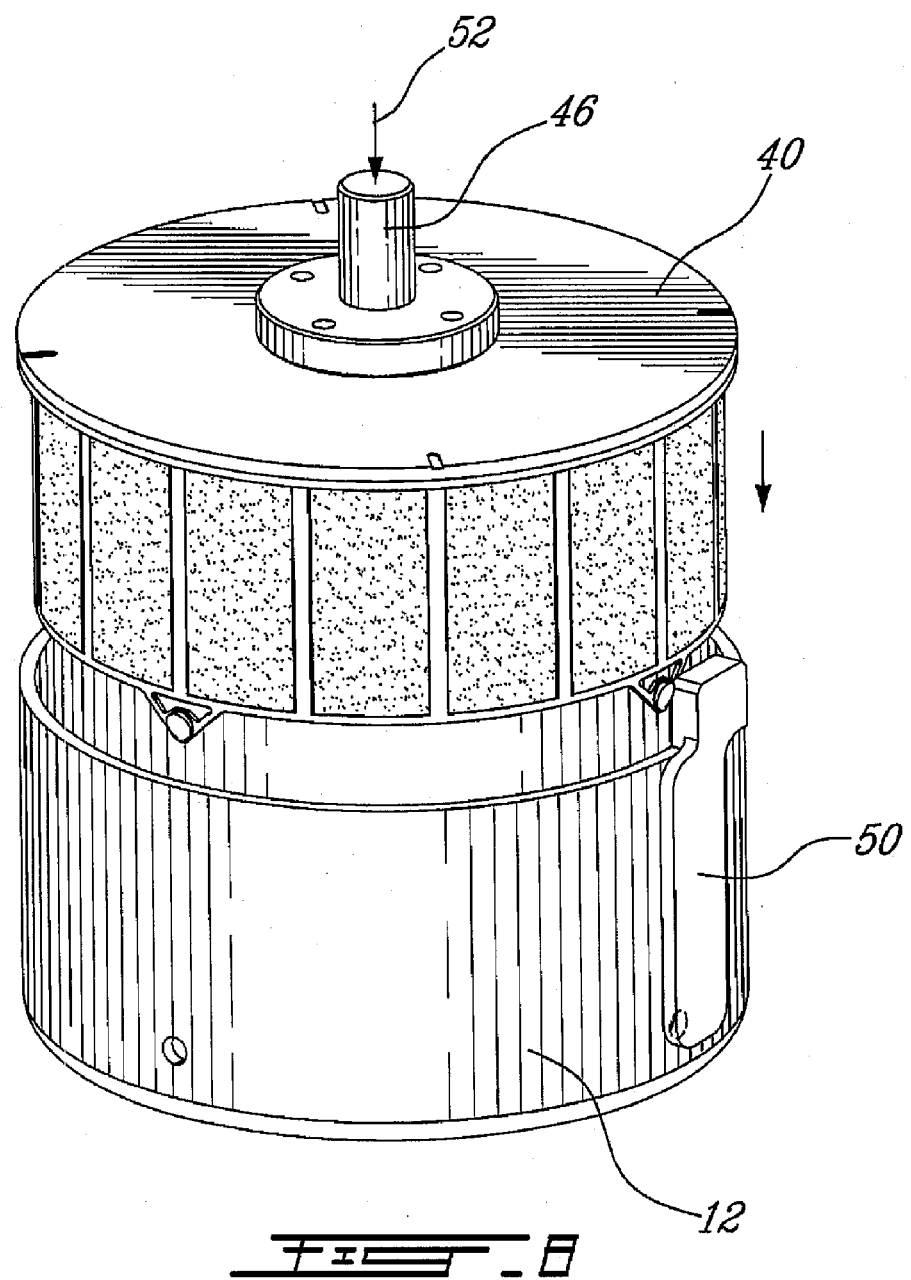
FIG. 8 is a perspective view of the permanent magnet mounting assembly being inserted in a rotor.

Turning now to FIGS. 6 to 8 of the appended drawings, the assembly of the rotor 10 will be described.

FIG. 6 is an exploded view illustrating a cage 16 and magnet support 40 having a cylindrical portion 42, a circular top portion 44 and a gripping portion 46 mounted to the top portion 44. The cylindrical portion 42 of the support 40 is made of magnetic susceptible material such as steel and is so sized that the permanent magnet retaining cage 16 may snugly fit thereon.

When the permanent magnet retaining cage 16 is mounted to the cylindrical portion 42, the magnets 14 may be mounted in the permanent magnet cavities 24. The magnets 14 are therefore attracted to the cylindrical portion 42 and are removably maintained thereon.

The result of these operations is illustrated in FIG. 7 showing the support 40 to which the permanent magnet retaining cage 16 and magnets 14 are mounted.

FIG. 8 illustrates the insertion of the permanent magnet retaining cage 16 and magnets 14 into the rotor 12. An optional aligning tool 50 including a circular projection (not shown) entering one aperture 28 is mounted to the body 12 to help the alignment of the clips 26 with the apertures 28. This alignment is preferably made before the magnets 14 contact the body 12. Once aligned, pressure is applied in the direction of arrow 52 until the clips 26 engage the apertures 28. Then, a pulling action on the gripping portion 46 disengages the support 40 from the rotor 12. Indeed, since the contact surface between the magnets 14 and the inner surface 36 of the body 12 is greater than the contact surface between the magnet 14 and the support 40, the pulling action will disengage the support 40 from the magnets 14 and the permanent magnet retaining cage 16.

Figure 9:
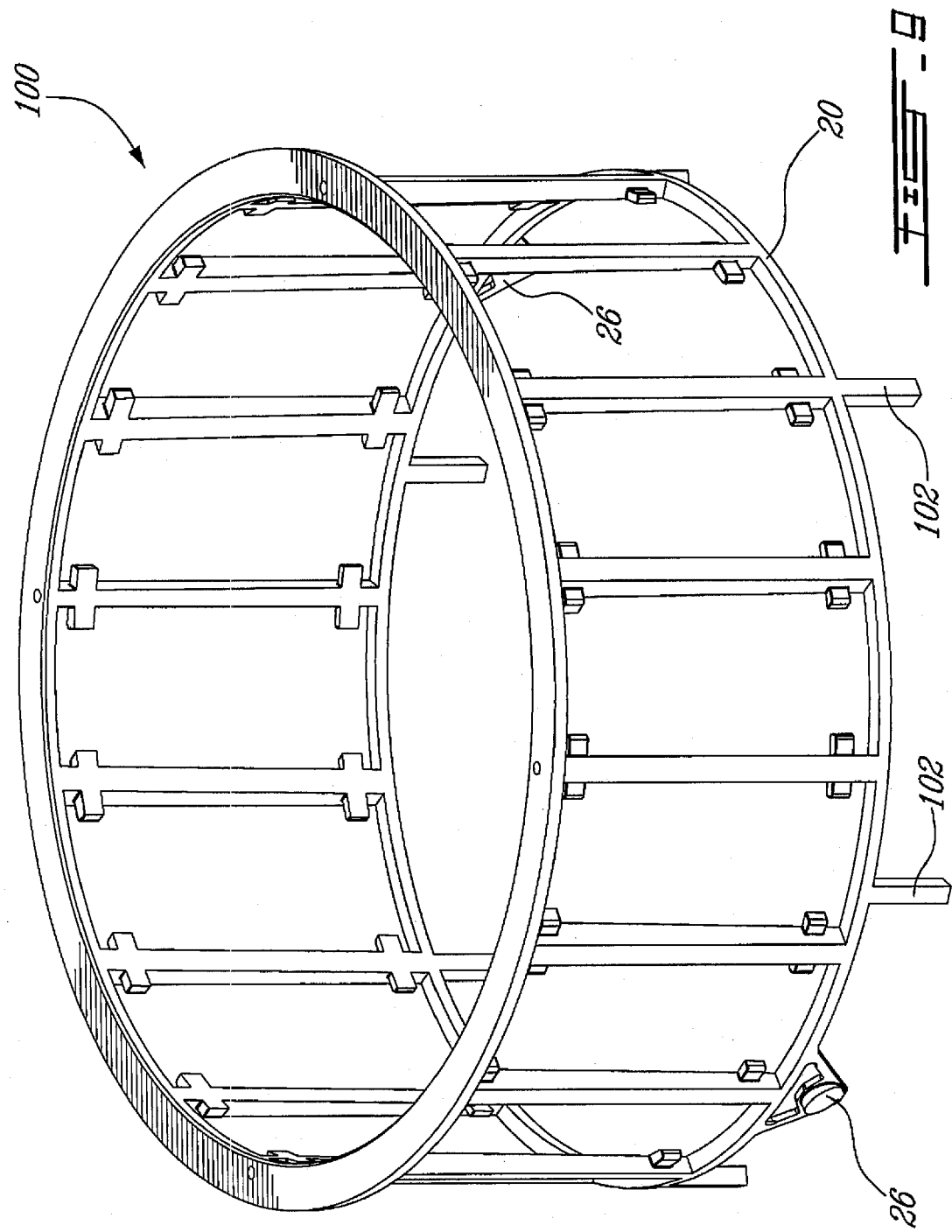
FIG. 9 is a perspective view of a magnet retaining cage for a rotor according to a second embodiment of the present invention.
Figure 10:
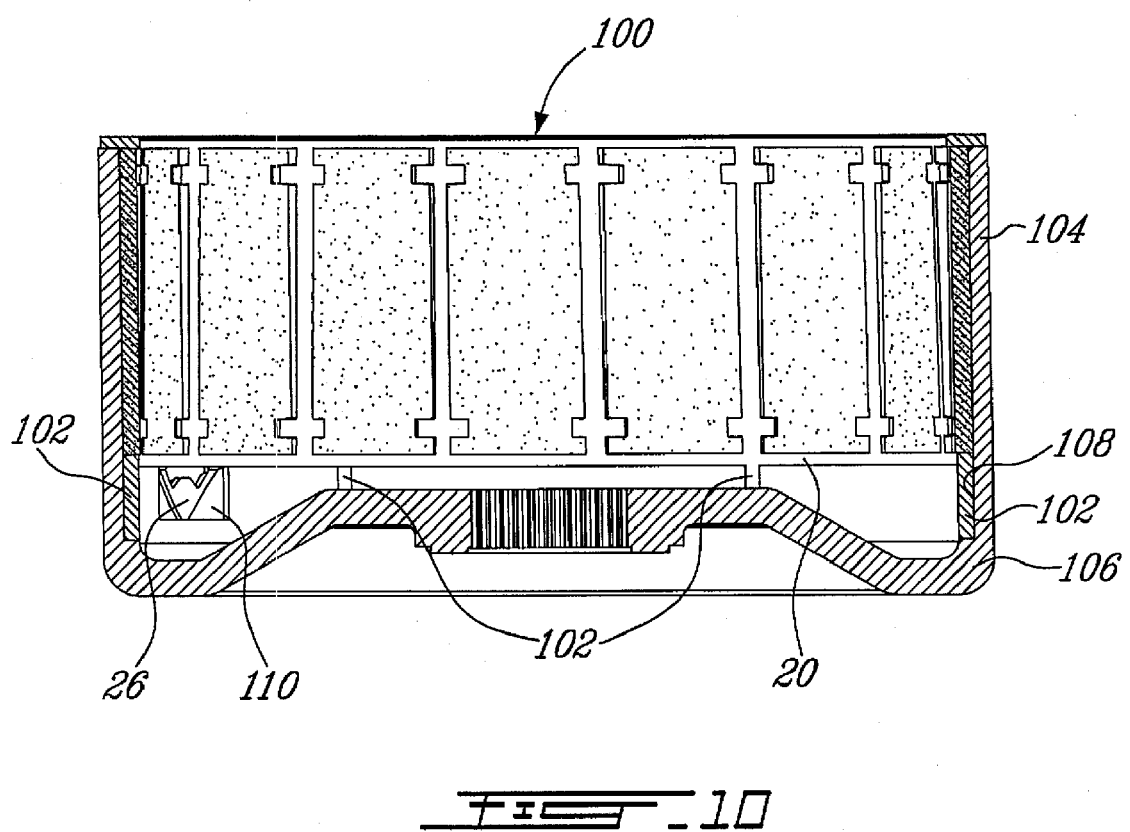
FIG. 10 is a sectional view illustrating a rotor assembly provided with the magnet retaining cage of FIG. 9; this figure illustrates the projections being engaged in cut-outs.
Figure 11:
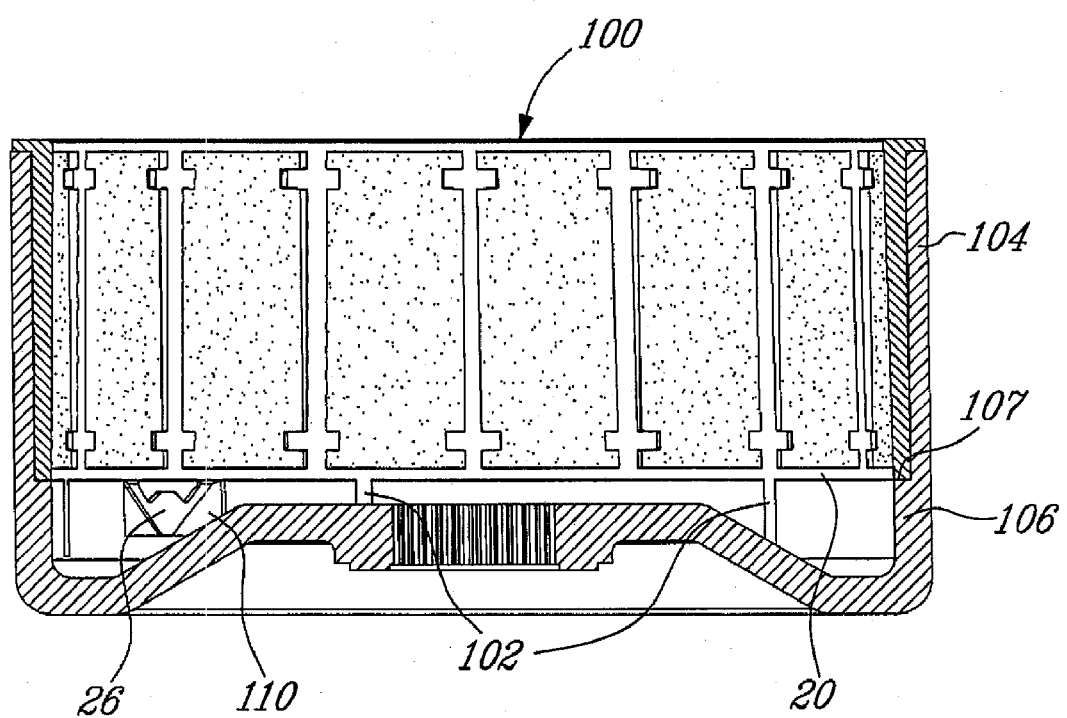
FIG. 11 is a sectional view similar to FIG. 10 but illustrating the abutment of the lower ring abutting a shoulder defined by the thicker portion.

Turning now to FIGS. 9 to 11 of the appended drawings, a permanent magnet retaining cage 100 according to a second embodiment of the present invention will be described. It is to be noted that since the permanent magnet retaining cage 16 and the permanent magnet retaining cage 100 are very similar, and for concision purpose, only the differences therebetween will be described hereinbelow.

The permanent magnet retaining cage 100 includes only two clips 26 and includes six downward projections 102 that are generally the same thickness as the bottom ring 20. Generally stated, the projections 102 prevent rotational movements of the permanent magnet retaining cage 100 with respect to the body 104 while the clips 26 prevent axial movements therebetween. It is to be noted that the clips 26 and the projections 102 are integral with the other parts of the permanent magnet retaining cage 100.

As is apparent from FIGS. 10 and 11, the body 104 of the rotor has a portion 106, near its base, where the wall is thicker. The difference in thickness is generally equal to the thickness of the permanent magnet retaining cage 100. Accordingly, the bottom ring 20 of the permanent magnet retaining cage 100 sits on a shoulder 107 created by the thicker portion 106.

The thicker portion 106 includes six cutouts 108 configured, positioned and sized as to receive the projections 102 therein. Since the projections 102 snugly fit into the cutouts 108, rotation of the permanent magnet retaining cage 100 with respect to the body 104 is prevented.

The thicker portion 106 also includes two wider cutouts 110 to allow the clips 26 to enter the apertures 28 to thereby prevent axial movements between the permanent magnet retaining cage 100 and the body 104.

The assembly and operation of the permanent magnet retaining cage 100 is similar to the assembly and operation of the permanent magnet retaining cage 16 described hereinabove and will therefore not be further discussed herein.

Figure 12:
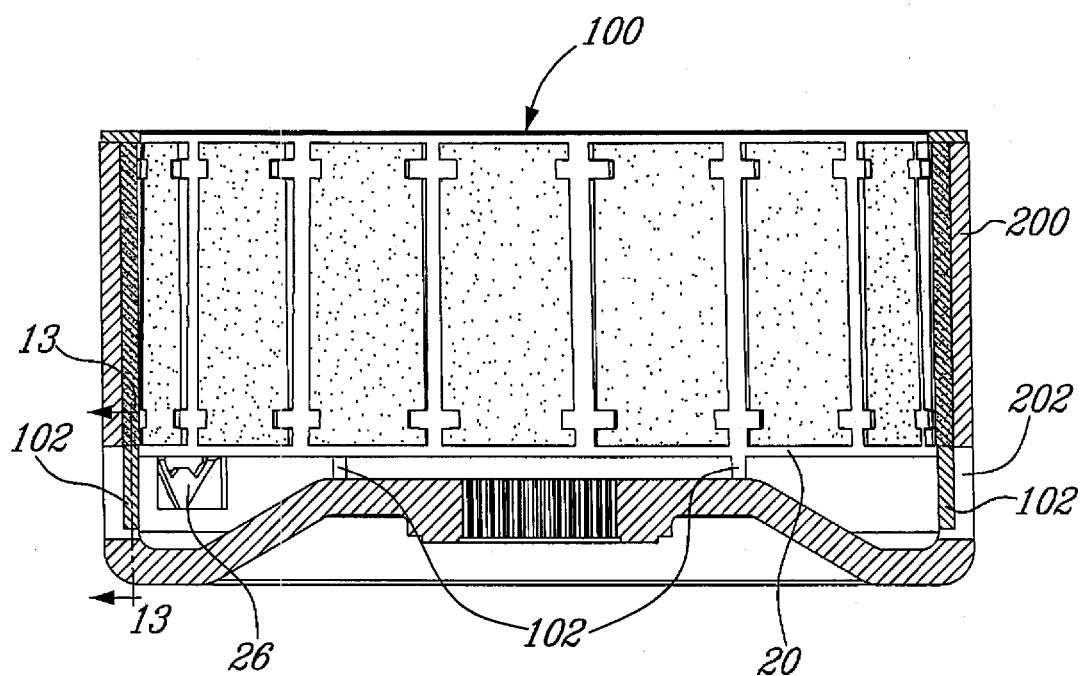
FIG. 12 is a sectional view similar to FIG. 10 but illustrates another embodiment of the rotor body where the cut-outs for the projections have been done through the entire thickness of the rotor body.

FIG. 12 of the appended drawings illustrate an alternate rotor body 200 configured to receive the permanent magnet retaining cage 100 of FIG. 9. The body 200 is very similar to the body 104 of FIG. 10. Accordingly, only the differences between these bodies will be described hereinbelow.

The main difference between the body 200 and the body 104 concerns the cutout portions used to receive the projections 102 of the permanent magnet retaining cage 100. Indeed, while the cutouts 108 of FIG. 10 are done only in a portion of the thickness of the body 104, the cutouts 202 of the body 200 are made in the entire thickness of the body 200. Accordingly, these cutouts 202 may be made from the outside of the rotor body 200.

Figure 13:
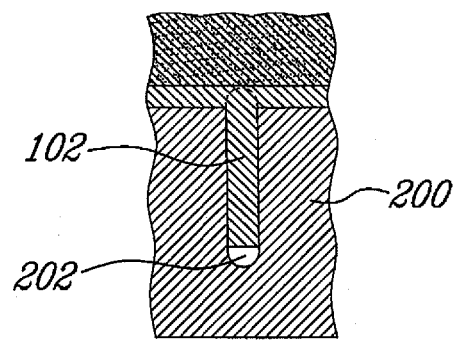
FIG. 13 is a sectional view taken along line 13-13 of FIG. 12.
Figure 14:
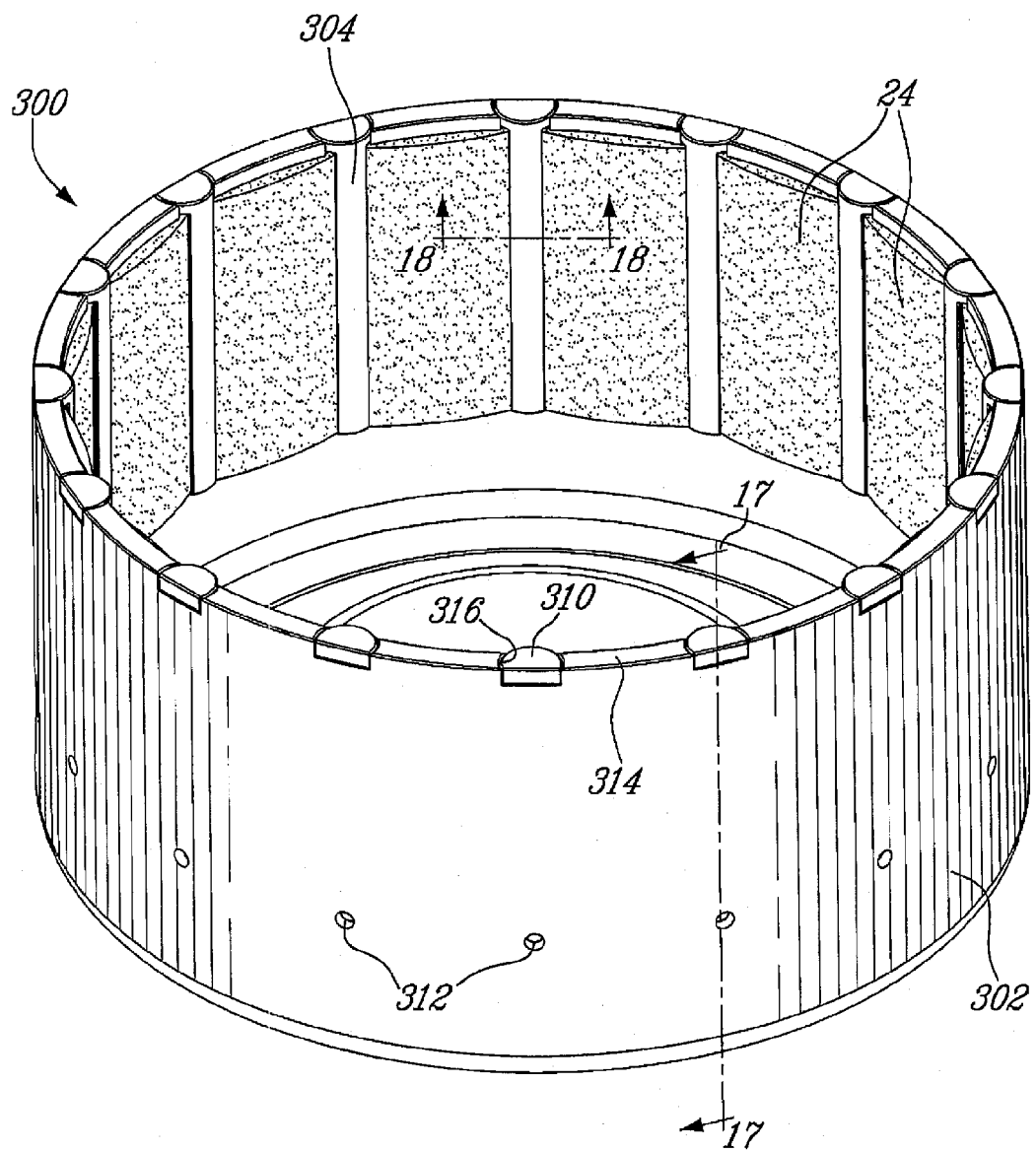
FIG. 14 is a perspective view of a rotor according to a third embodiment of the present invention.
Figure 19:
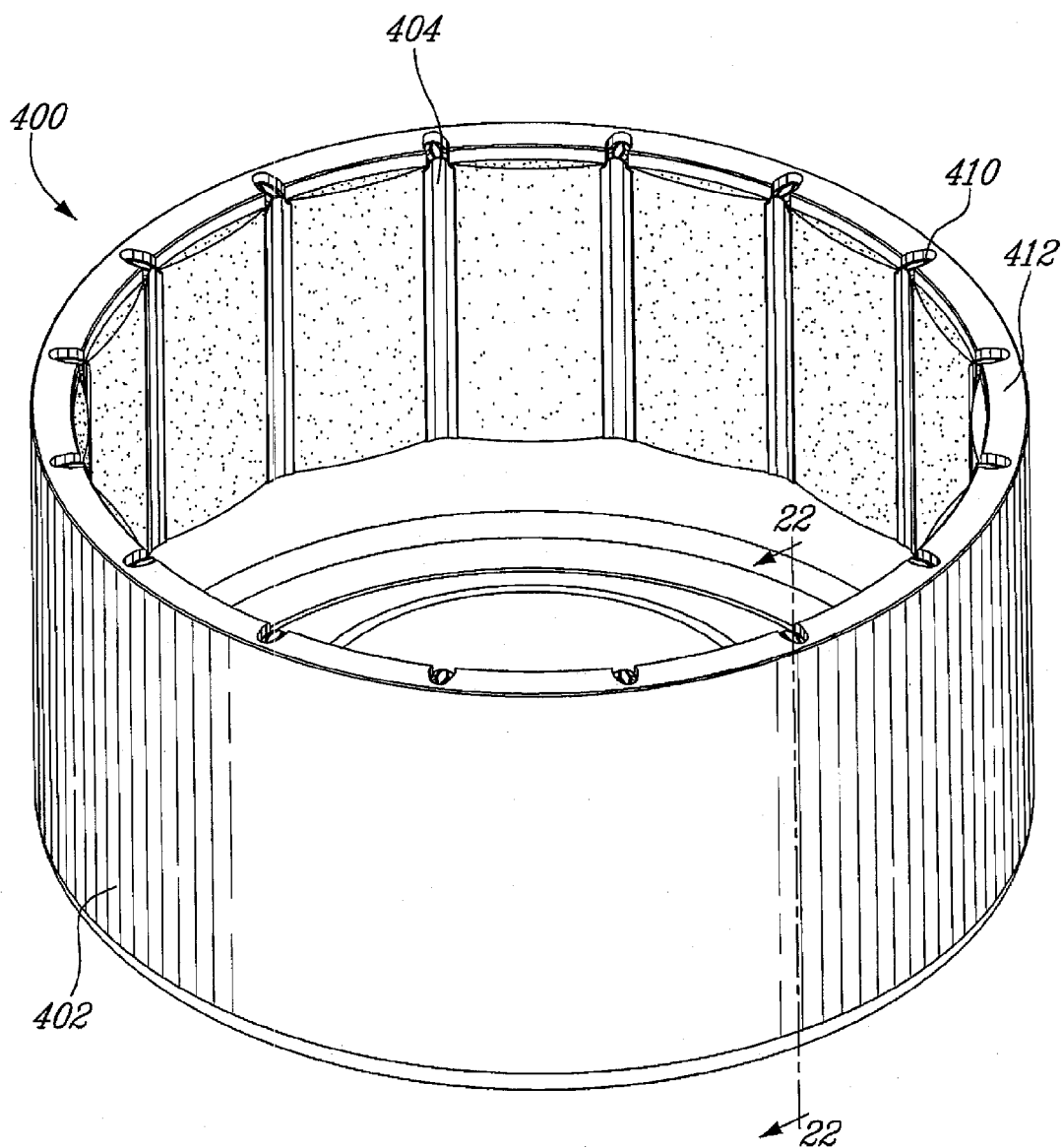
FIG. 19 is a perspective view of a rotor according to a fourth embodiment of the present invention.

As can be better seen from FIG. 13, the cutouts 202 are generally oblong.

One skilled in the art will appreciate that other means for separately or commonly prevent axial and rotational movements between the permanent magnet retaining cage and the body of the rotor could be designed without departing from the spirit and nature of the present invention.

Is it also to be noted that even though the permanent magnet retaining cage is described herein as being molded in a suitable plastic material, other non-magnetic materials such as an aluminum alloy could be used. Non-limiting examples of suitable plastics for this application include Rynite FR530 010 and Ryton R7 both manufactured by Dupont™.

Turning now to FIGS. 14 to 17 a rotor assembly 300 according to a third illustrative embodiment of the present invention will be described.

The rotor assembly 300 includes a body 302, sixteen (16) magnets 24 and sixteen (16) spacing elements 304 replacing the permanent magnet retaining cage 16 described hereinabove.

FIGS. 15 and 16 illustrate one of the sixteen identical spacing elements 304. The spacing element 304 includes a longitudinal body 306 having a generally T-shaped cross-section, a radial projection 308 provided at a distal end of the body 306 and a head 310 provided at a proximate end of the body 306.

As can be better seen from FIG. 18 of the appended drawings, the generally T-shaped cross section of the body 306 allow the lateral portions of the magnets 24 to be snugly fit therein.

Returning to FIG. 14, the rotor body 302 includes sixteen (16) radial apertures 312 so configured and sized as to snugly receive the radial projections 308 therein (see FIG. 17). This projection and aperture arrangement prevents both circumferential and longitudinal movements of the distal end of the spacing element 306.

The free end 314 of the rotor body 302 includes sixteen (16) cutout portions 316 each being so configured and sized as to receive the head 310 of a respective spacing element 304. As can be better seen from FIG. 17, the depth of the cutout portions 316 is such that the top of the head 310 is flush with the free end 314 of the rotor body 302. The head and cutout arrangement prevents both circumferential and radial movements of the proximate end of the spacing element 304.

As can be seen from FIG. 16, the inner surface 318 of the rotor body 302 includes a shoulder 320 where the spacing elements 304 and the magnets 24 abut.

To assemble the rotor assembly 300, one first installs one spacing element 304 so that the projection 308 enters one aperture 312 while the head 310 is placed in the corresponding cut-out portion 316. A magnet 24 is then placed on the inner surface of the rotor body 302 so as to abut the central portion of the generally T-shaped body 306. A second spacing element is then positioned on the other side of the installed magnet so that the projection 308 enters one aperture 312 while the head 310 is placed in the corresponding cut-out portion 316. This is repeated for the sixteen magnets 24 and spacing elements 304 to yield a completed rotor assembly.

Turning now to FIGS. 19 to 22 of the appended drawings, a rotor assembly 400 according to a fourth illustrative embodiment of the present invention will be described. Since the rotor assembly 400 is very similar to the rotor assembly 300 described hereinabove with reference to FIGS. 14 to 18, only the difference between these rotor assemblies will be described hereinbelow.

Generally stated, the main difference between the rotor assemblies 300 and 400 concerns the spacing element 404. While it has the same function as the spacing element 304, the spacing element 404 does not have a projection or other securing elements on its distal end 406. The proximate end includes a longitudinal projection 408 configured and sized to enter a cut-put portion 410 of the free end 412 of the rotor body 402.

As can be seen from FIGS. 20 and 21, the generally T-shaped cross section of the spacing element 404 allow the magnets 24 (not shown in these figures) to be snugly fit therein.

One skilled in the art will easily understand that the spacing elements 22 of the rotors 10, 100 and 200 and the individual spacing elements 304 and 404 of the rotors 300 and 400 have the same function which is to properly space the magnets 24 on the inner surface of the rotor body and prevent relative movements of the magnets with respect to the rotor body.

It is also to be noted that while the individual spacing elements 304 and 404 can be made of plastic material as discussed with respect to the permanent magnet retaining cage, the may also be made of non-ferromagnetic metals or metal alloys such as, for example, aluminum or aluminum alloys, brass alloys.

It is to be noted that while a rotor assembly provided with sixteen permanent magnets mounted to the inner surface of the rotor body has been described hereinabove, the number of magnets can vary. Generally, at least two magnets are required.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention as defined in the appended claims.

What is claimed is:

1. A rotor assembly for an external rotor electric machine, the rotor assembly comprising:
    a generally cylindrical rotor body including an inner surface and a free end; the rotor body defining a longitudinal rotation axis;
    at least two permanent magnets longitudinally mounted to the inner surface of the rotor body,
    at least two spacing elements longitudinally mounted to the inner surface of the rotor body between adjacent permanent magnets; each spacing elements includes a distal end, a proximate end and a longitudinal body between the proximate and distal ends, the at least two spacing elements configured and sized to prevent relative movement of the permanent magnets with respect to the rotor body and made of a non-magnetic material; the longitudinal body has a generally T-shaped cross section defined by a surface abutting narrow portion and a larger portion distanced from the inner surface of the rotor body; the T-shaped cross section configured and sized to receive lateral portions of the permanent magnets between the larger portion and the inner surface of the rotor body.

2. The rotor assembly of claim 1, wherein the free end of the rotor body includes cutout portions and wherein the proximate end of each spacing element includes a head configured and sized to be received in the cutout portions.

3. The rotor assembly of claim 2, wherein the head and cutout portions are configured to prevent both circumferential and radial movement of the proximate end of the spacing element when the head is received in the cutout portion.

4. The rotor assembly of claim 2, wherein the distal end of each spacing element includes a radial projection and wherein the rotor body includes apertures aligned with the cutout portions to receive the radial projection to thereby position the each spacing element longitudinally and to prevent circumferential and longitudinal movements of the distal end of the spacing element with respect to the rotor body.

5. The rotor assembly of claim 1, wherein the proximate end of each spacing element includes a longitudinal projection and wherein the free end of the rotor body includes cut-out portions configured and sized to receive the respective longitudinal projections.

6. The rotor assembly of claim 1 further comprising a top ring and a bottom ring; the proximate end of each at least two spacing elements integral with the top ring and the distal end of each at least two spacing elements integral with the bottom ring.

7. The rotor assembly of claim 6, wherein the top ring includes a flange configured and sized to contact a free end of the rotor body.

8. The rotor assembly of claim 6, wherein the bottom ring and the rotor body include interconnecting elements preventing undesired movements between the bottom ring and the rotor body.

9. The rotor assembly of claim 8, wherein the interconnecting elements include apertures in the rotor body and corresponding clips integral with the bottom ring and configured and sized to enter the apertures of the rotor body; the clips and apertures being configured to prevent both longitudinal and circumferential movements of the bottom ring with respect to the rotor body.

10. The rotor assembly of claim 8, wherein the interconnecting elements include longitudinal projections integral with the bottom ring and cutout portions provided on the inner surface to receive the longitudinal projections to prevent circumferential movement of the bottom ring with respect to the rotor body.

11. The rotor assembly of claim 1, wherein the non magnetic material is selected from the group consisting of plastics, aluminium alloys, brass alloys.

12. A rotor assembly for an external rotor electric machine, the rotor assembly comprising:
    a generally cylindrical rotor body including an inner surface and a free end; the rotor body defining a longitudinal rotation axis;
    at least two permanent magnets longitudinally mounted to the inner surface of the rotor body,
    at least two spacing elements longitudinally mounted to the inner surface of the rotor body between adjacent permanent magnets; each spacing elements includes a distal end, a proximate end and a longitudinal body between the proximate and distal ends, the at least two spacing elements configured and sized to prevent relative movement of the permanent magnets with respect to the rotor body and made of a non-magnetic material;
    the inner surface of the rotor body includes a shoulder receiving the distal end of the spacing elements in an abutting relationship.

13. The rotor assembly of claim 12, wherein the non magnetic material is selected from the group consisting of plastics, aluminium alloys, brass alloys.

14. The rotor assembly of claim 12, wherein the free end of the rotor body includes cutout portions and wherein the proximate end of each spacing element includes a head configured and sized to be received in the cutout portions.

15. The rotor assembly of claim 14, wherein the head and cutout portions are configured to prevent both circumferential and radial movement of the proximate end of the spacing element when the head is received in the cutout portion.

16. The rotor assembly of claim 12, wherein the proximate end of each spacing element includes a longitudinal projection and wherein the free end of the rotor body includes cut-out portions configured and sized to receive the respective longitudinal projections.

* * * * *